(12) United States Patent
Da Pont et al.

(10) Patent No.: US 9,366,358 B2
(45) Date of Patent: Jun. 14, 2016

(54) SOLENOID PILOT VALVE FOR A HYDRAULIC VALVE, IN PARTICULAR FOR HOUSEHOLD APPLIANCES

(71) Applicant: ELBI INTERNATIONAL S.P.A., Turin (IT)

(72) Inventors: Paolo Da Pont, Turin (IT); Paolo Ravedati, Moncalieri (IT); Giosue Capizzi, Buttigliera Alta (IT); Maurizio Rendesi, Villarbasse (IT); Fabrizio Paris, Druento (IT); Roberto Bosio, Turin (IT); Francesco Di Benedetto, Grugliasco (IT)

(73) Assignee: ELBI INTERNATIONAL S.P.A., Turin (IT)

( * ) Notice: Subject to any disclaimer, the term of this patent is extended or adjusted under 35 U.S.C. 154(b) by 85 days.

(21) Appl. No.: 14/365,192

(22) PCT Filed: Dec. 12, 2012

(86) PCT No.: PCT/IB2012/057231
§ 371 (c)(1),
(2) Date: Jun. 13, 2014

(87) PCT Pub. No.: WO2013/088364
PCT Pub. Date: Jun. 20, 2013

(65) Prior Publication Data
US 2014/0326912 A1 Nov. 6, 2014

(30) Foreign Application Priority Data

Dec. 14, 2011 (IT) .................... TO2011A001148

(51) Int. Cl.
*F16K 31/40* (2006.01)
*F16K 31/06* (2006.01)

(52) U.S. Cl.
CPC ........... *F16K 31/0675* (2013.01); *F16K 31/404* (2013.01)

(58) Field of Classification Search
CPC .......................... F16K 31/404; F16K 31/0675
USPC ........ 251/129.15, 30.01, 30.02, 30.03, 30.04, 251/30.05
See application file for complete search history.

(56) References Cited

U.S. PATENT DOCUMENTS

| 3,672,627 A | 6/1972 | McCarty, Jr. et al. |
| 3,818,398 A | 6/1974 | Barbier et al. |

(Continued)

FOREIGN PATENT DOCUMENTS

| DE | 195 44 984 A1 | 6/1996 |
| EP | 0 840 048 A1 | 5/1998 |

OTHER PUBLICATIONS

International Search Report for PCT/IB2012/057231 dated Mar. 6, 2013.
Written Opinion for PCT/IB2012/057231 dated Mar. 6, 2013.

*Primary Examiner* — John K Fristoe, Jr.
*Assistant Examiner* — Andrew J Rost
(74) *Attorney, Agent, or Firm* — Sughrue Mion, PLLC (57) ABSTRACT

The pilot valve (14) comprises a body (7, 7a) in which there is defined a control chamber (11) which is intended to communicate with the inlet (3) of the hydraulic valve (1) and which, through a restricted outlet passage (12) associated with a valve seat (13), is able to be selectively brought into communication with the outlet (4) of the hydraulic valve (1); at least one core (23) mounted movably within a portion (7a) of said body (7, 7a) and inside the control chamber (11) and carrying a closing member (24) cooperating with the valve seat (13); and an actuator (16-21) including a solenoid or coil (15) of copper wire, mounted around said portion (7a) of the body (7, 7a), for selectively controlling the position of the core (23) and the closing member (24) with respect to the valve seat (13) and the communication between the control chamber (11) and the restricted outlet passage (12); and wherein the ratio of the diameter (d) of the restricted outlet passage (12) to the weight (m) of the solenoid (16) is between 0.06 and 0.10 mm/g.

9 Claims, 10 Drawing Sheets

(56) References Cited

U.S. PATENT DOCUMENTS

| | | | | |
|---|---|---|---|---|
| 4,450,863 A * | 5/1984 | Brown | ................. | A47L 15/4217 |
| | | | | 134/57 D |
| 5,058,624 A * | 10/1991 | Kolze | ................. | G05D 23/1393 |
| | | | | 251/30.04 |
| 5,449,142 A * | 9/1995 | Banick | ................. | F16K 31/404 |
| | | | | 251/30.04 |
| 5,904,334 A * | 5/1999 | Grunert | ................. | F16K 31/404 |
| | | | | 251/30.04 |
| 5,941,502 A * | 8/1999 | Cooper | ................ | F16K 27/0281 |
| | | | | 251/129.15 |
| 6,457,697 B1 | 10/2002 | Kolze | | |
| 6,684,901 B1 * | 2/2004 | Cahill | ................. | F16K 31/0655 |
| | | | | 137/15.18 |
| 8,464,998 B2 * | 6/2013 | Maercovich | ............ | E03C 1/057 |
| | | | | 251/30.04 |
| 8,500,087 B2 * | 8/2013 | Cheng | ................... | F16K 31/404 |
| | | | | 251/129.15 |

* cited by examiner

SOLENOID PILOT VALVE FOR A HYDRAULIC VALVE, IN PARTICULAR FOR HOUSEHOLD APPLIANCES

CROSS REFERENCE TO RELATED APPLICATIONS

This application is a National Stage of International Application No. PCT/IB2012/057231 filed Dec. 12, 2012, claiming priority based on Italian Patent Application No. TO2011A001148 filed Dec. 14, 2011, the contents of all of which are incorporated herein by reference in their entirety.

The present invention relates to a solenoid pilot valve for a hydraulic valve, in particular for household appliances, such as a hydraulic valve for filling a laundry washing machine or dishwasher with water.

More specifically the invention relates to a solenoid pilot valve of the type comprising:
- a body in which there is defined a control chamber which is intended to communicate with the inlet of the hydraulic valve and which, through a restricted outlet passage associated with the valve seat, is able to be selectively brought into communication with the outlet of the hydraulic valve;
- at least one core mounted movably within a portion of said body and inside said chamber and carrying a closing member cooperating with the valve seat; and
- an actuator including a solenoid or coil of copper wire, mounted around said portion of the body, for selectively controlling the position of the core and the closing member with respect to the valve seat and the communication between the control chamber and said outlet passage.

Solenoid pilot valves of this type, such as valves of the ON-OFF type for household appliances, are very common.

In these pilot valves the actuating solenoid is a component which has a high cost in relation to the overall cost of the valve itself.

The cost of the solenoid has increased in particular during recent years owing to the more or less exponential increase in the international price of copper.

The search for constructional solutions which are able to reduce the overall dimensions and hence the cost of such pilot valves has become a priority.

One object of the present invention is therefore to propose an improved solenoid pilot valve which is able to satisfy the aforementioned general need to reduce the manufacturing cost.

This object, together with other objects, is achieved according to the invention by a solenoid pilot valve of the type specified above, characterized primarily in that the ratio of the diameter of the aforementioned restricted outlet passage to the weight of the solenoid is between 0.06 and 0.10 mm/g.

Conveniently, according to a further aspect of the present invention, the ratio of the axial length or height of the solenoid to the internal diameter thereof is greater than 1, and preferably less than 1.5.

Moreover, the ratio of the internal diameter of the solenoid to the external diameter of the core is advantageously less than 2.

In the case of a solenoid intended to be energized with an a.c. voltage of between 200 and 230 V, the solenoid preferably comprises between about 10,500 and 12,500 turns of copper wire having a diameter of between 0.049 and 0.056 mm.

In the case of a solenoid intended to be energized with an a.c. voltage of between 100 and 127 V, said solenoid conveniently comprises between 5,000 and 6,500 turns of copper wire having a diameter of between 0.063 and 0.080 mm.

Further characteristic features and advantages of the invention will become clear from the following detailed description provided purely by way of a non-limiting example, with reference to the accompanying drawings in which.

In the drawings, 1 denotes overall a hydraulic valve for a household appliance, such as a valve for filling a laundry washing machine or dishwasher with water.

The hydraulic valve 1 is provided with a solenoid pilot valve and its general structure is substantially known per se.

Figure 1:
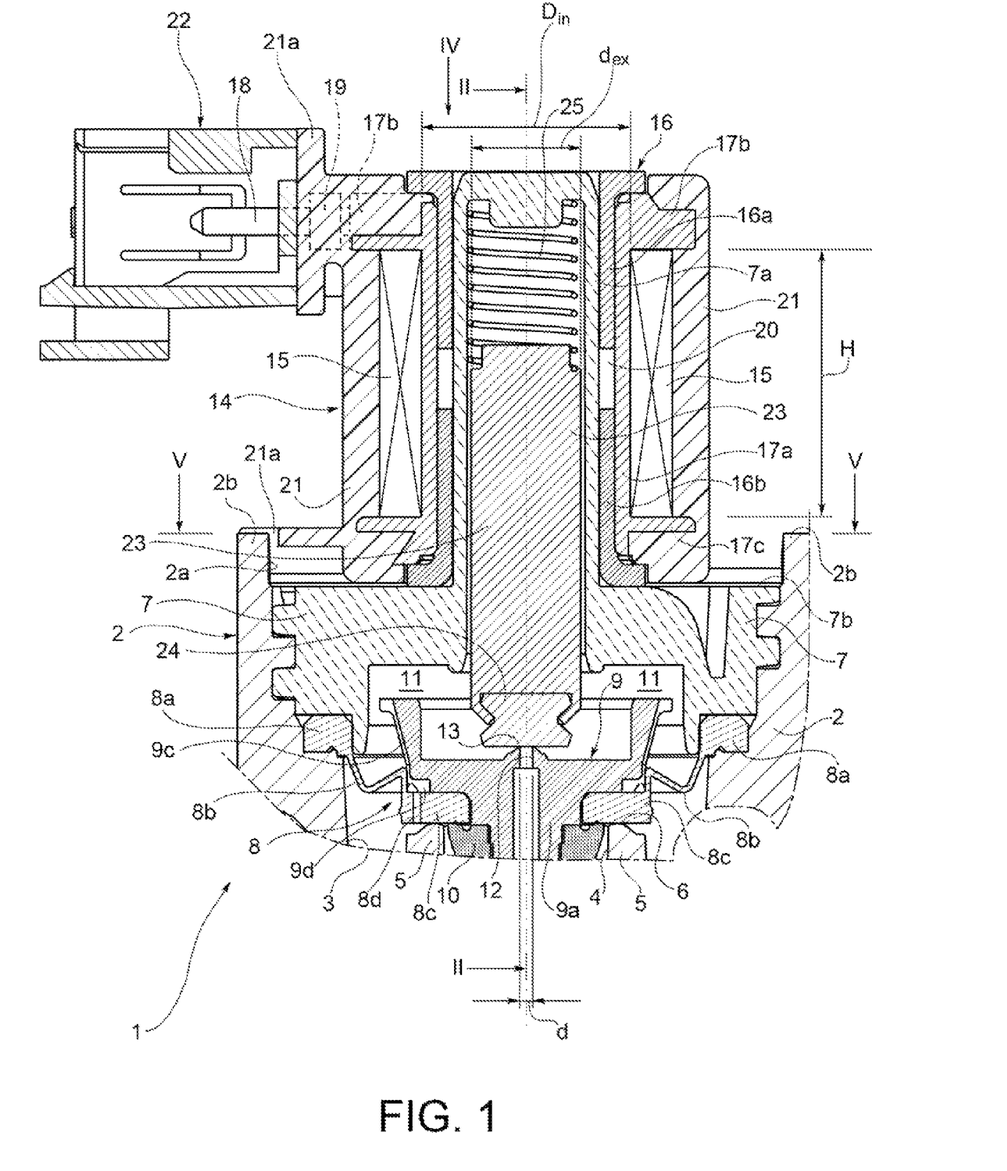
FIG. 1 shows a partial axially sectioned view of a hydraulic valve for a household appliance, provided with a solenoid pilot valve according to the present invention.

The valve 1 comprises in particular an essentially rigid body 2, for example made of moulded plastic, in which an inlet passage 3 for a hydraulic fluid and an outlet passage 4 for this fluid are provided.

The outlet passage 4 is formed in a tubular formation 5 of the body 2 which at the top defines a seat 6, which is the seat of the hydraulic valve 1, or main valve seat. Via this valve seat 6 a fluid flow during operation is able to pass from the inlet 3 to the outlet 4.

A second body 7, which is for example also made of moulded plastic, is joined at the top in a fluid-tight manner to the body 2, for example by means of a threaded connection. This body 7 is in fact the body for supporting the solenoid pilot valve 14 which will be described in detail below.

A peripheral portion 8a of an annular membrane denoted overall by 8 is gripped between the bodies 2 and 7.

This membrane 8 comprises a flexible intermediate portion 8b, which connects the peripheral portion 8a to a thicker central annular portion 8c intended to act as a main closing member cooperating with the seat 6 of the hydraulic valve 1.

The portion 8c of the membrane 8 is mounted around a shank 9a of an essentially cup-shaped guide element 9 and is locked onto this shank by means of an annular element 10.

The shaped body 7 has a top tubular formation 7a which is closed at the distal end.

A control chamber denoted by 11 is defined between the body 7 and the assembly formed by the membrane 8 and by the associated guide element 9.

The control chamber 11 is permanently in fluid communication with the inlet 3, through at least one passage which in the example of embodiment shown is formed in the closing unit comprising the membrane 8 and the associated guide element 9.

In particular, as can be seen in FIG. 1, a plurality of through-holes 8d are formed in the portion 8c of the membrane 8, on the outside of the valve seat 6.

These holes 8d communicate with an annular compartment 9b which is formed in the membrane guide element 9 and communicates in turn with corresponding outer grooves 9c likewise formed in the membrane guide 9.

As an alternative to the solution shown, the permanent communication between the inlet 3 of the hydraulic valve 1 and the control chamber 11 may be achieved for example by means of passages provided in the bodies 2 and 7 of the electrovalve device 1.

In FIG. 1, 12 denotes a passage formed in the membrane guide 9 and able to bring the control chamber 11 into communication with the outlet passage 4.

In the embodiment shown the top end of the passage 12 has an upwardly projecting edge 13 acting as a seat for the pilot valve, as will be clarified more fully below.

In the embodiment shown in the drawings, the passage 12 is formed in the membrane guide 9 in a central axial position. This characteristic feature is however not obligatory.

The hydraulic valve 1 also comprises a control electrovalve or solenoid pilot valve denoted overall by 14.

This pilot valve comprises an actuating solenoid 15 with which, in a manner known per se, a magnetic circuit comprising a sleeve 16 essentially in the form of a square ring is associated.

Figure 2:
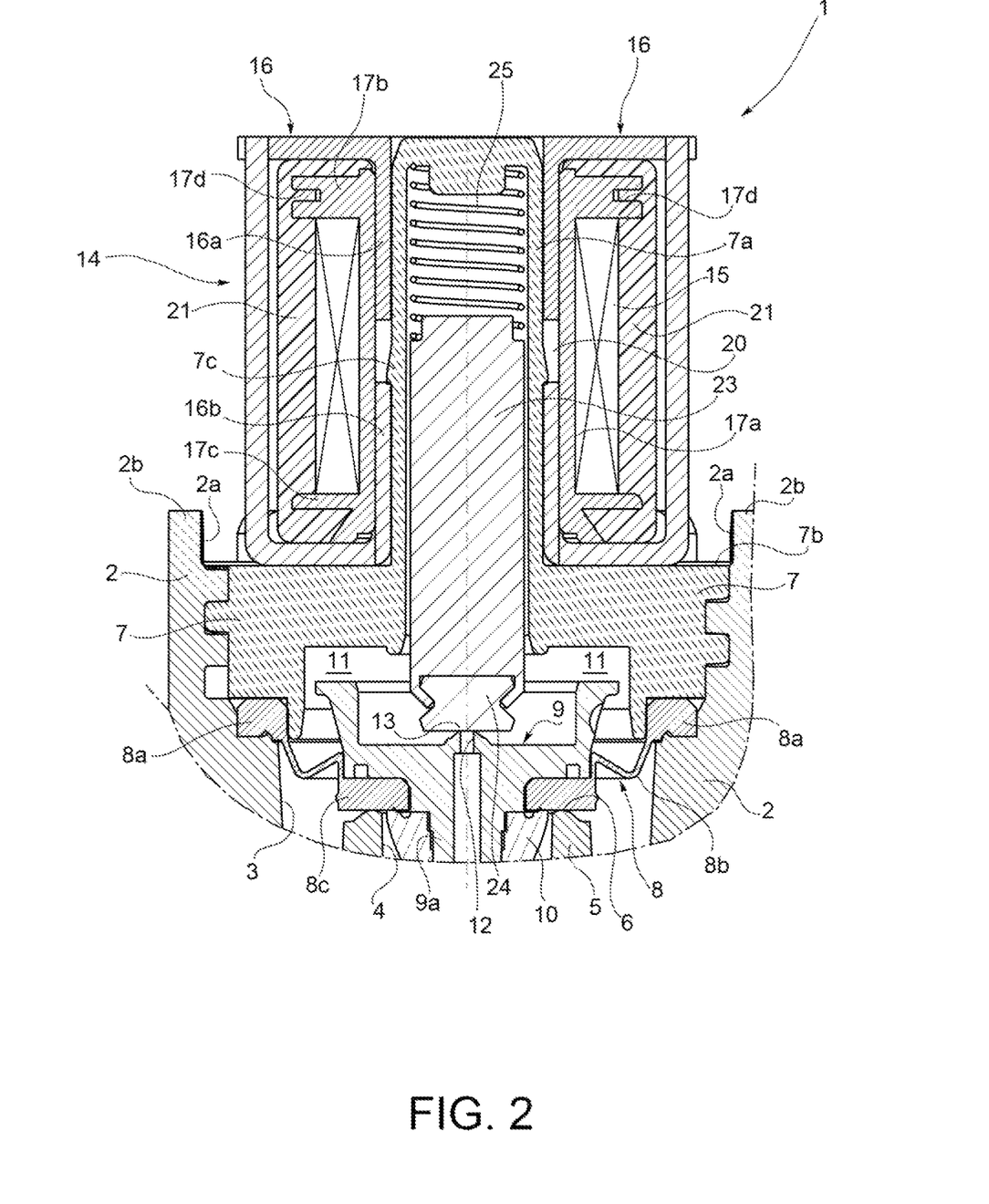
FIG. 2 is a partial view sectioned along the line II-II of FIG. 1.
Figure 3:
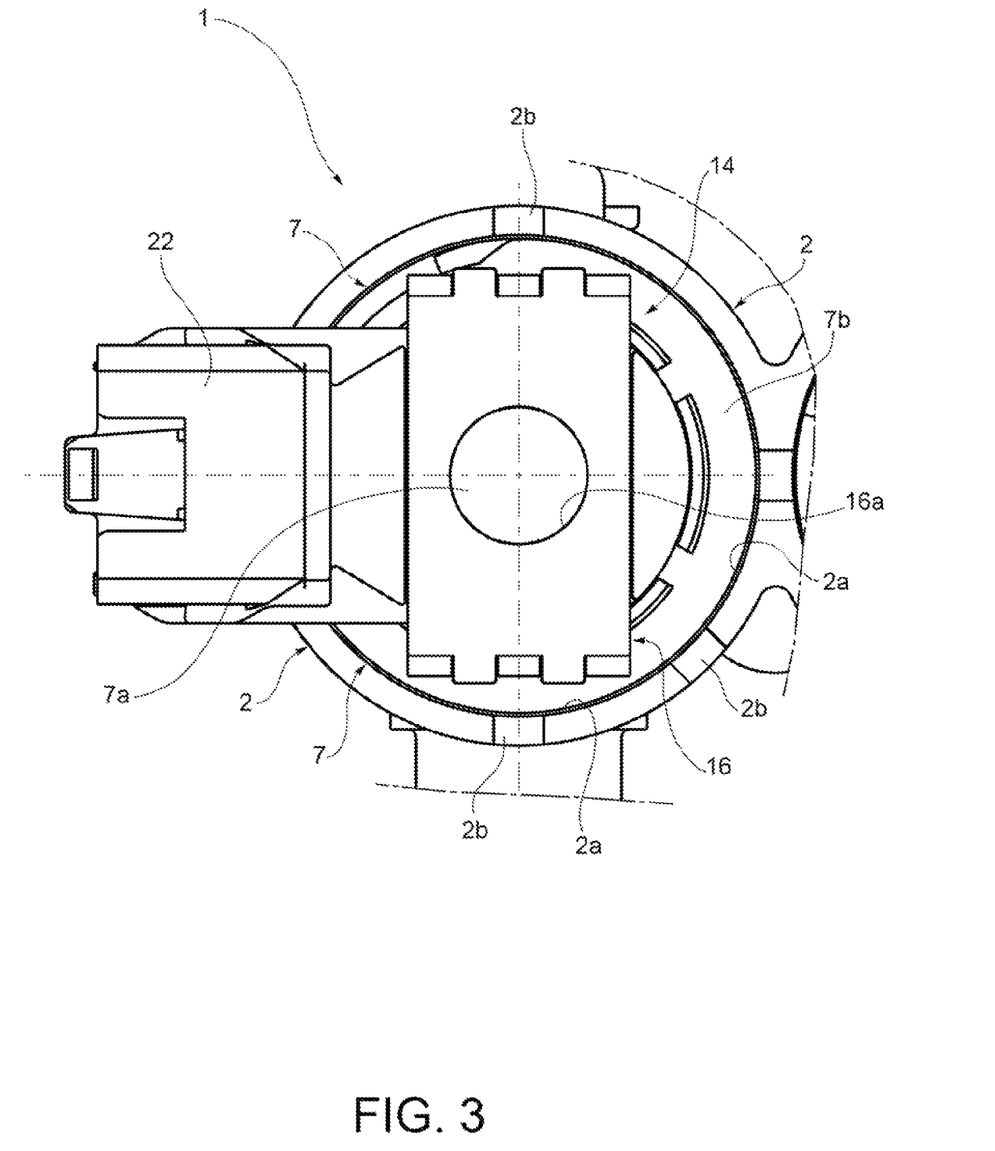
FIG. 3 is a view similar to that of FIG. 2 and shows a variation of embodiment.
Figure 4:
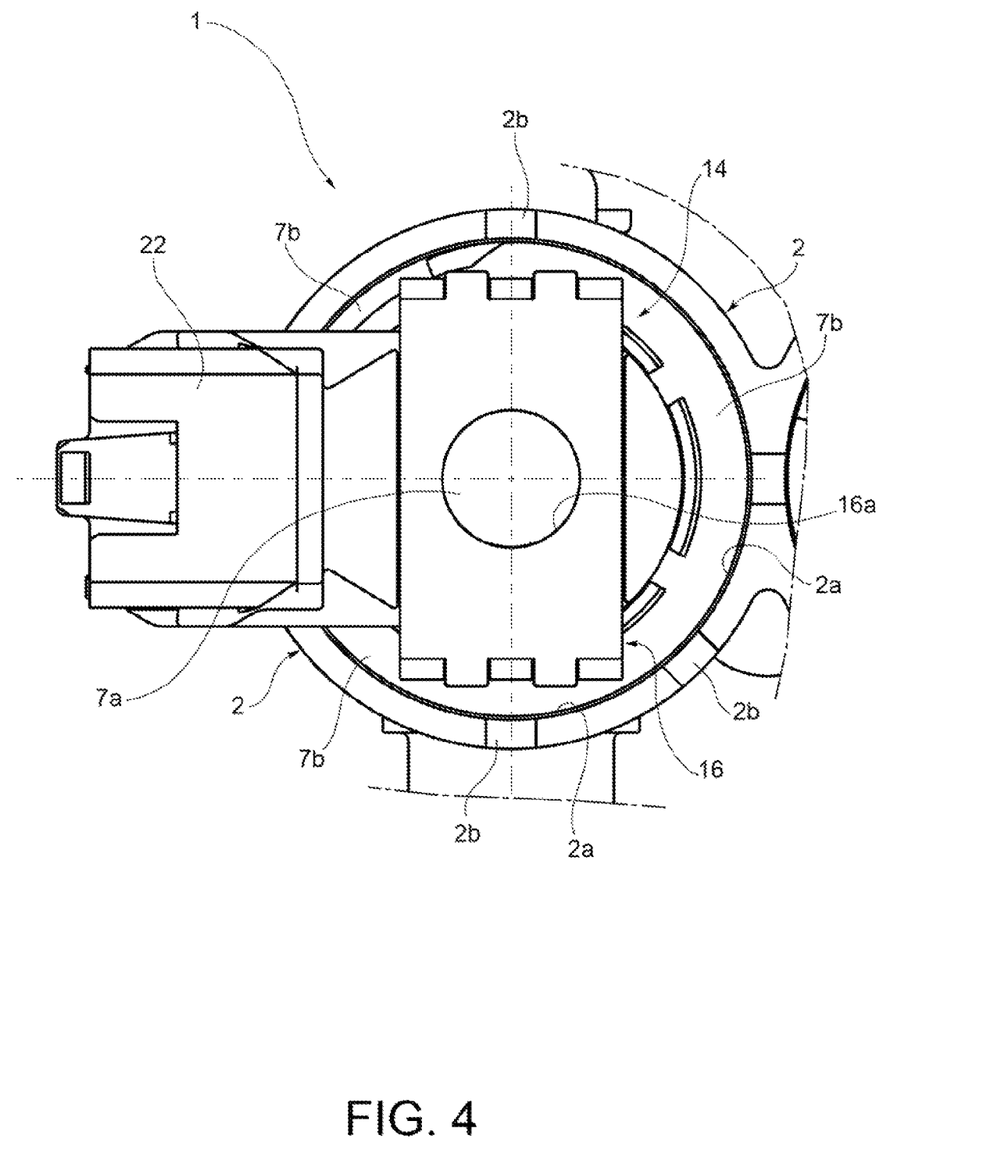
FIG. 4 is a partial top plan view in the direction of the arrow IV of FIG. 1.

As can be seen in particular in FIGS. 2, 3 and 4, the sleeve 16 has limited dimensions which, in the direction transverse to the axis of the core 23, are appreciably smaller than the maximum dimensions of the base part 7b of the body.

The solenoid 15 consists of a reel of insulated copper wire wound around the cylindrical intermediate portion 17a of a reel denoted overall by 17.

With reference to FIGS. 1, 2, 7 and 8, in the embodiment shown the reel 17 has two end flanges 17b and 17c, at the top and bottom respectively.

Figure 7:
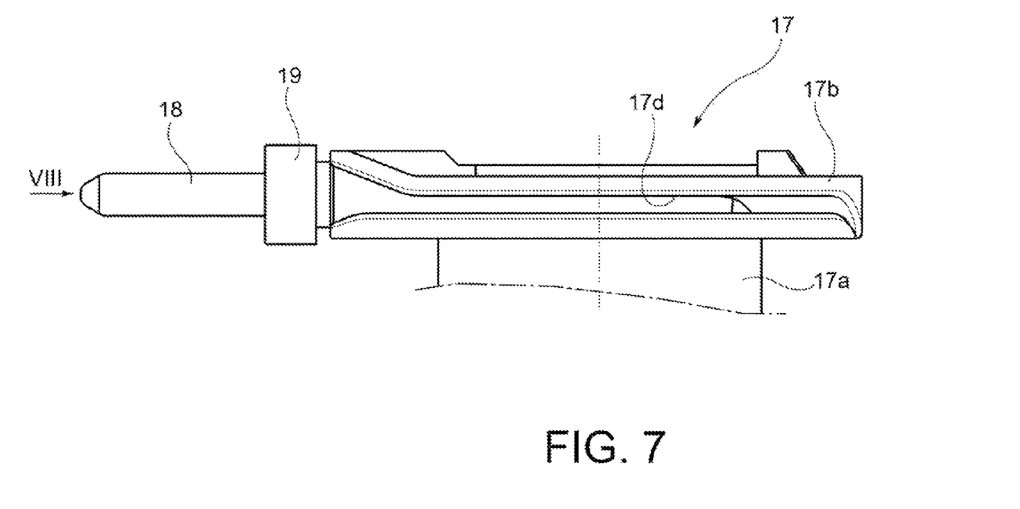
FIG. 7 is a partial side view of a reel for the solenoid of a pilot valve according to the present invention.
Figure 8:
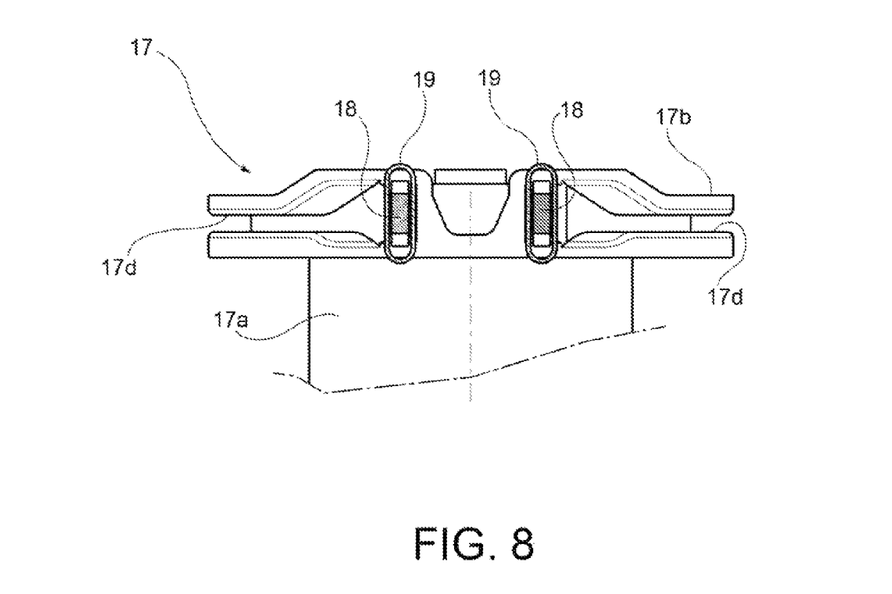
FIG. 8 is a front view in the direction of the arrow VIII of FIG. 7.

As can be seen in FIGS. 2, 7 and 8, the top flange 17b of the reel 17 has two lateral grooves 17d for receiving the ends of the copper wire which forms the winding or solenoid 15.

Two connection members 18, made of electrically conductive material, for example in the form of flat pins (FIGS. 1, 7 and 8), are fastened in the top flange 17b of the reel 17.

The connection members 18 protrude in a near radial direction, parallel to each other.

Since, as will emerge more clearly below, in the pilot valve 14 according to the invention, the winding or solenoid 15 is preferably made using a copper wire with a particularly small diameter, the problem exists as to how to achieve a reliable connection of the ends of this winding to the connection members 18.

In a currently preferred way of implementing this connection, each end of the copper wire of the solenoid 15 is wound onto a corresponding connection terminal 18.

Respective bushes 19 of electrically conductive material, in particular copper, are than fitted onto the terminals 18 so that they are arranged around the terminals of the solenoid 15, which are wound there.

The bushes 19 are then compressed and welded, for example by means of electric resistance welding, around the ends of the wire of the solenoid 15, on corresponding connection terminals 18.

In the embodiment shown by way of example the sleeve 16 of magnetic material has tubular portions 16a, 16b which extend from the opposite sides or sections of the sleeve 16, aligned and coaxial with each other, inside the tubular portion 17a of the reel 17 (see in particular FIGS. 1 and 2).

The tubular portions 16a and 16b may be formed by means of deep-drawing. Alternatively, these portions may be made as separate tubes which are fitted inside corresponding openings provided in the sleeve 16.

The tubular formation 7a of the body 7 is conveniently snap-engaged with the sleeve 16. In the embodiment according to FIG. 2, this tubular formation 7a has a plurality of projections 7c with a triangular profile which are force-fitted through and beyond the portion 16b of the sleeve 16 and which extend back out into the interspace or air-gap between the portions 16b and 16a of this sleeve.

Figure 2A:
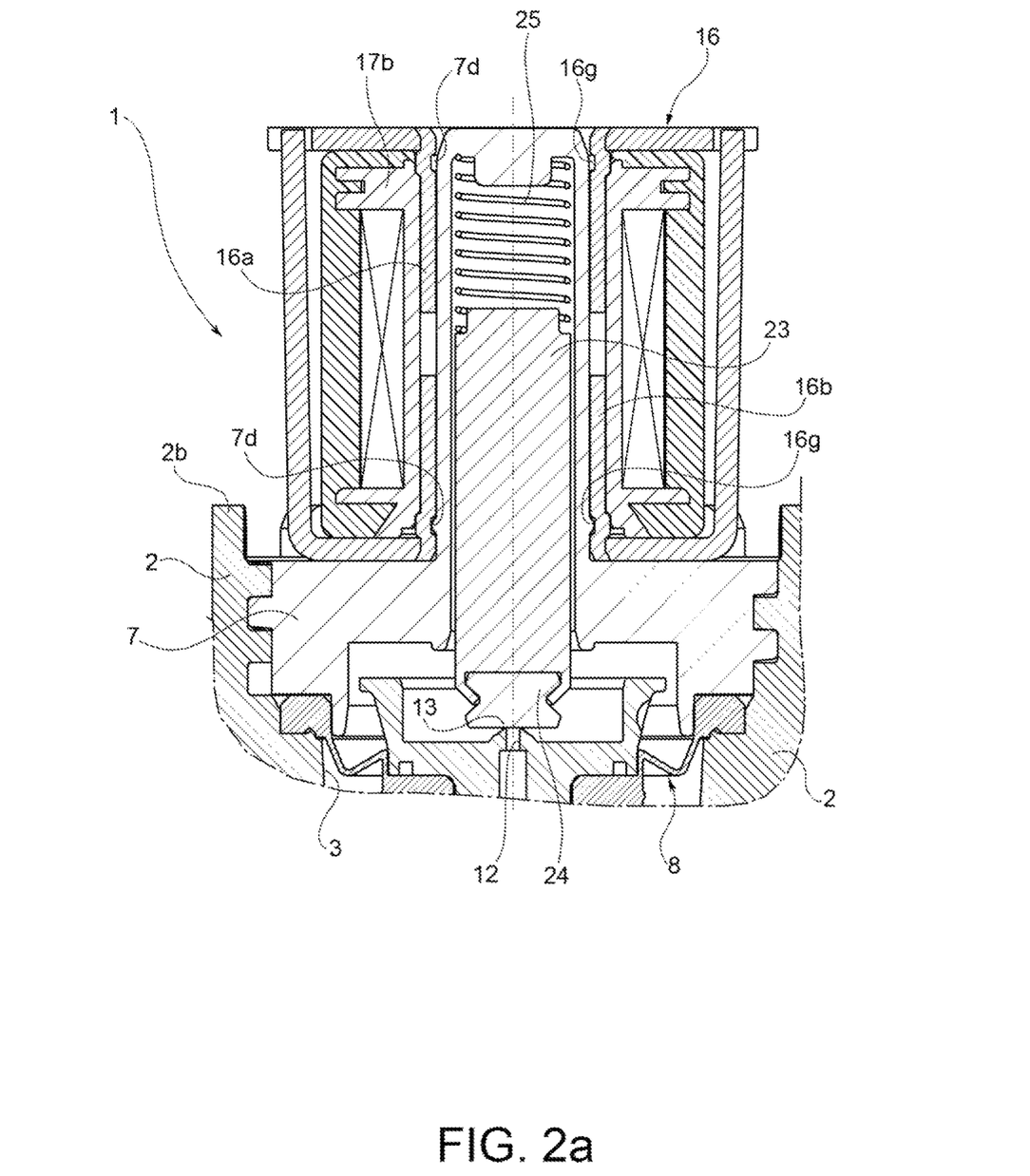
FIG. 2a is a view similar to that of FIG. 2 and shows a partial variation of embodiment.

FIG. 2a shows moreover a variation of embodiment in which the tubular formation 7a of the body 7 has a plurality of projections 7d which are snap-engaged inside corresponding recessed seats 16g provided in the tubular portions 16a and 16b of the sleeve 16.

In the embodiment shown the assembly formed by the reel 17 and by the associated solenoid 15 is encapsulated inside a casing 21 of electrically insulating material, for example moulded plastic.

This casing forms integrally a lug 21a (FIGS. 1 and 4) from which the connection members 18 protrude externally.

In the embodiment shown the connection members 18 extend inside a shaped body 22 joined to the lug 21a of the casing 21 and able to define the female part of an electric connector for connecting the solenoid 15 to an external control circuit not shown.

With reference to FIGS. 1 to 5, around the opening 2a of the base body 2 of the hydraulic valve 1, where the body 7 is mounted, said body 2 forms a plurality of positioning projections 2b protruding upwards and able to define a plurality of angular positions in which the assembly formed by the solenoid 15-17 and the casing 21 (referred to below as "actuator unit") may be operationally arranged.

Figure 5:
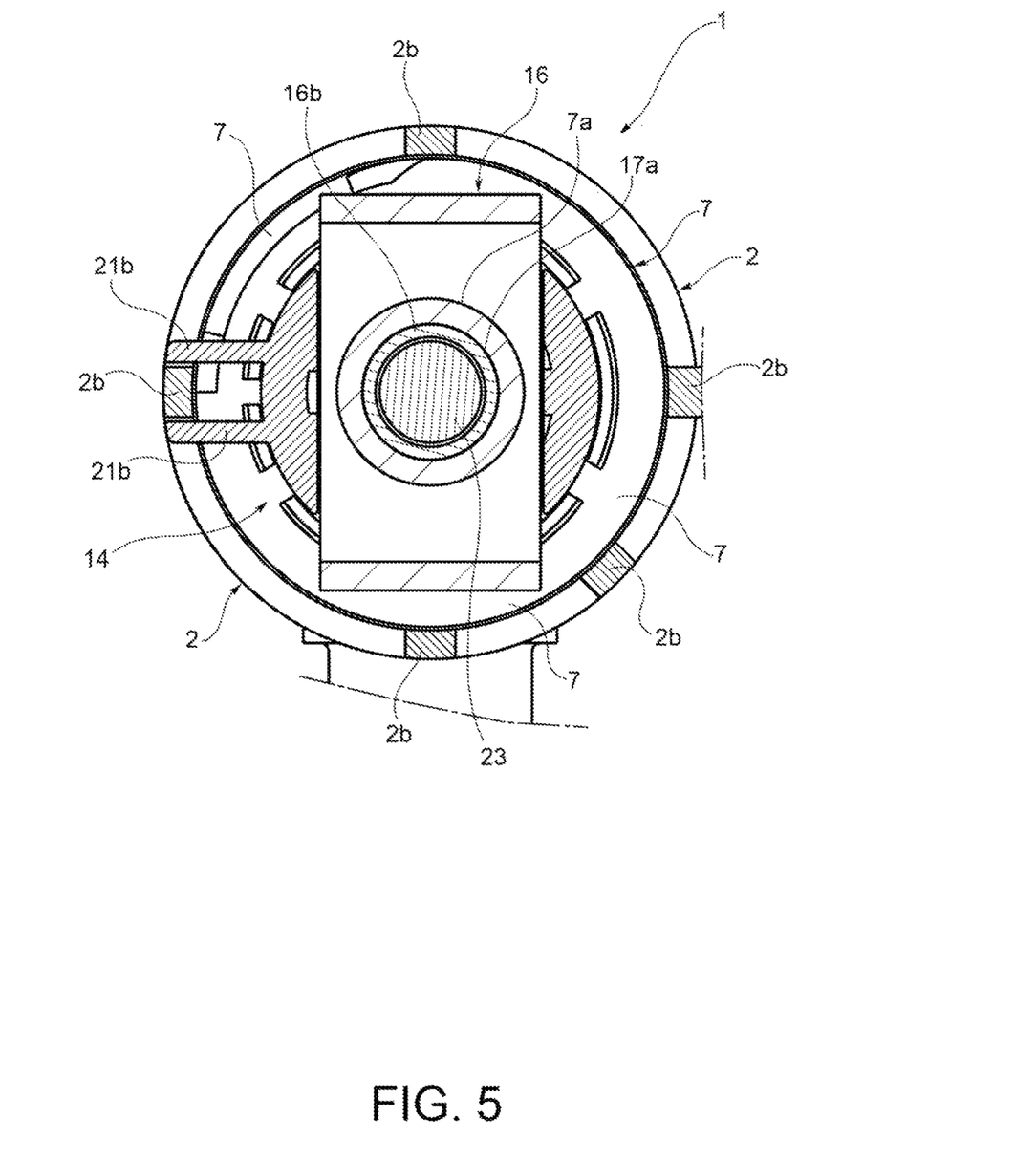
FIG. 5 is a partial view sectioned along the line V-V of FIG. 1.

In the embodiment according to FIGS. 1 and 5, the casing 21 of the actuator unit 15-21 forms at the bottom a pair of lugs 21b which are parallel and angularly spaced from each other (FIG. 5).

These lugs define together a kind of fork element suitable for being arranged selectively astride one of the positioning projections 2b of the body 2, as can be seen in particular in FIG. 5.

The aforementioned actuator unit 15-21 may thus be selectively arranged, relative to the body 2 of the hydraulic valve 1, in the angular position where connection of the connector 18-22 is easier or more convenient when the valve 1 is installed in the user apparatus.

Figure 6:
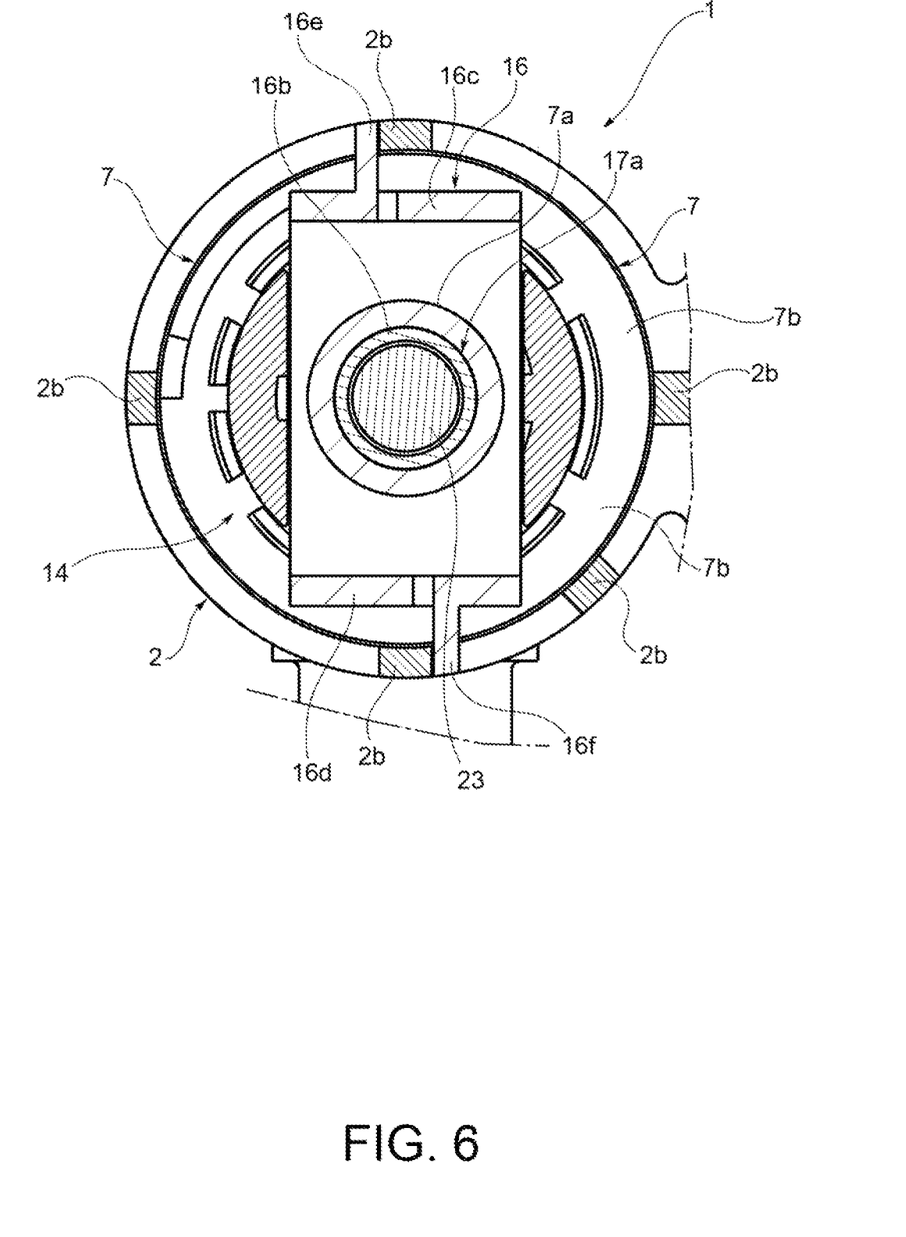
FIG. 6 is a view similar to that shown in FIG. 5 and shows a variation of embodiment.

FIG. 6 shows a variation of embodiment.

In this variant the opposite vertical sections 16c and 16d of the magnetic structure 16 form respective outwardly protruding lugs 16e and 16f able to be brought into contact with a different positioning projection 2b of the body 2 of the valve 1.

With this solution it is possible to simplify the constructional design of the casing 21 of the actuator unit 15-21, it being no longer necessary to provide the aforementioned lugs 21b of said casing.

The solenoid pilot valve 14 also comprises a moving core 23 made of ferromagnetic material and with a substantially cylindrical shape, having at the bottom a closing member 24 which, in the rest condition (valve 1 closed), presses against the valve seat 13.

A helical spring 25 is arranged between the top end of the core 23 and the top end wall of the tubular portion 7a of the body 7.

The spring 25 tends to push the core 23 downwards and the associated closing member 24 against the seat 13 of the pilot valve.

During operation, when the solenoid 15 is inactive (de-energized), the hydraulic fluid supplied to the inlet 3 of the valve 1 reaches the control chamber 11 via the passages 8d, 9b and 9c. The closing member 24 of the pilot valve 14 keeps the valve seat 13 closed and therefore the chamber 11 separated from the outlet passage 4 of the valve 1.

In these conditions, the control chamber 11 initially assumes, and then maintains, the same pressure as the hydraulic fluid in the inlet passage 3.

The portion 8c of the membrane 8, which acts as main closing member, presses against the valve seat 6, as a result of the greater surface area of this membrane and the associated membrane guide 9 exposed to the pressure inside the chamber 11 compared to the surface area of the membrane which is exposed to the pressure in the inlet passage 3.

The main hydraulic valve 1, 8c-6 is therefore closed.

When the solenoid 15 is energized, a magnetic flow passes into the core 23, the top end of which extends into the vicinity of the air gap 20 between the tubular portions 16a, 17b of the magnetic structure 16.

The core 23 is then attracted upwards, against the action of the helical spring 25, and the closing member 24 consequently frees the seat 13 of the pilot valve 14.

The pressure of the hydraulic fluid in the control chamber 11 may thus be released towards the outlet passage 4 of the valve 1, through the restricted passage 12 of the membrane guide 9.

When the pressure drops inside the control chamber 11, the pressure which inside the inlet passage 3 strikes the membrane 8 manages to cause raising of the assembly formed by this membrane 8 and the associated membrane guide 9, in fact causing opening of the main hydraulic valve 1, 8c-6.

The hydraulic fluid supplied to the valve 1 at the inlet passage 3 may thus reach the outlet passage 4 through the valve seat 6.

When the solenoid 15 is de-energized again, the core 23 assumes again the position shown in FIGS. 1 and 2, under the action of the helical spring 25.

The closing member 24 thus closes again the seat 13 of the pilot valve 14, and the control chamber 11 is again disconnected from the outlet passage 4 of the valve 1.

The closing assembly including the membrane 8 and the membrane guide 9 associated with it assumes again the closed position shown in FIGS. 1 and 2.

In FIG. 1, d denotes the diameter of the restricted passage 12 located downstream of the seat 13 of the pilot valve 14.

Moreover, $D_i$ indicates the internal diameter of the solenoid 15 and H denotes the axial length or height of this solenoid.

$d_{ex}$ denotes instead the external diameter of the core 23.

With a view to drastically reducing the dimensions and cost of the actuator unit 15-21 of the pilot valve 14, conveniently the ratio d/m of the diameter d of the restricted outlet passage 12 of the pilot valve to the weight m of the solenoid 15 is conveniently between 0.06 and 0.10 mm/g.

It should be noted in this connection that, in solenoid pilot valves according to the prior art for hydraulic valves of household appliances, this ratio d/m is instead generally between 0.02 and 0.05 mm/g.

Moreover, in a pilot valve 14 according to the present invention, the ratio of the axial length H of the solenoid 15 to the internal diameter $D_m$ thereof is greater than 1, and preferably less than 1.5.

This condition results in the formation of a solenoid which is relatively long and with a small diameter, allowing an improved heat dissipation to be achieved.

Preferably, the ratio of the internal diameter $D_{in}$ of the solenoid 15 to the external diameter $d_{ex}$ of the core 23 is advantageously less than 2.

In the case where the solenoid 15 is intended to be energized with an a.c. voltage of between 200 and 230 V, this solenoid 15 advantageously comprises between about 10,500 and 12,500 turns of copper wire having a diameter of between 0.049 and 0.056 mm.

If instead the solenoid 15 is intended to be energized with an a.c. voltage of between 100 and 127 V, this solenoid then advantageously comprises between about 5,000 and about 6,500 turns of copper wire having a diameter of between 0.063 and 0.080 mm.

Owing to the characteristic features illustrated above, the average length of the turns of the solenoid 15 is reduced and moreover, for the same number of turns, the electric resistance of this solenoid is reduced and likewise the mass or weight of the copper required is reduced.

Figure 9:
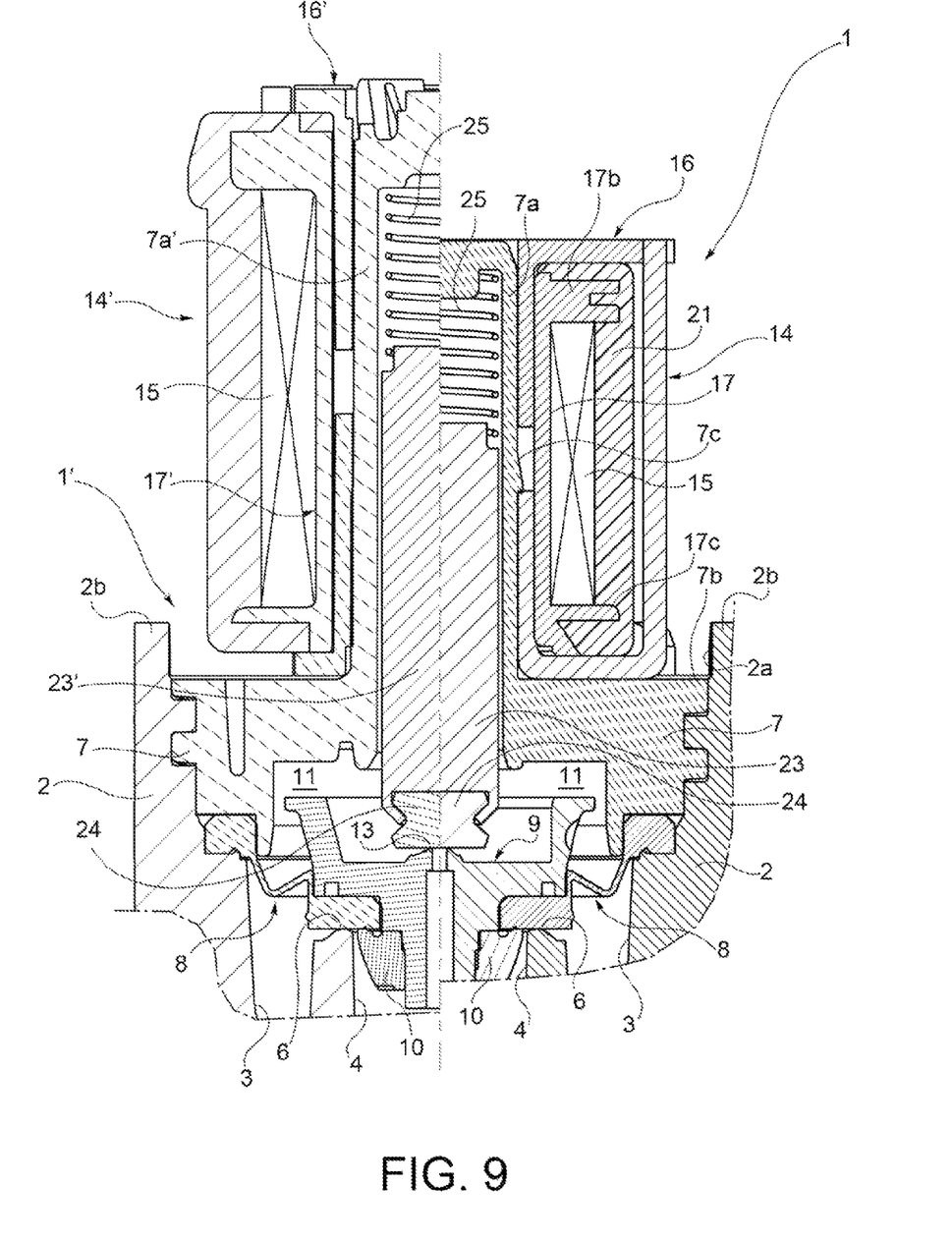
FIGS. 9 and 10 are comparison views of a pilot valve according to the prior art, shown on the left-hand side, with a pilot valve according to the present invention, shown on the right-hand side.
Figure 10:
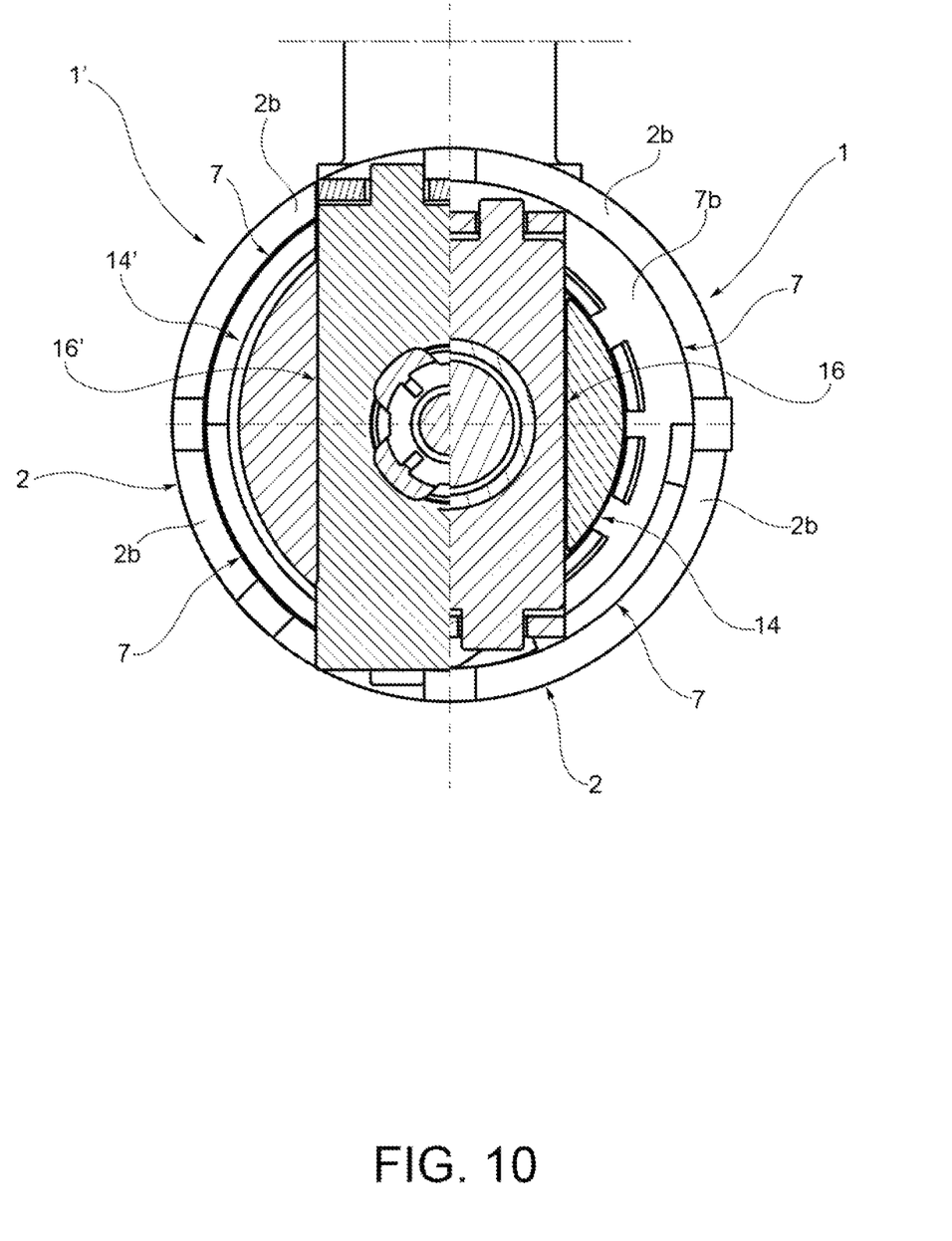

FIGS. 9 and 10 of the enclosed drawings propose a direct comparison between a hydraulic valve 1 provided with a solenoid pilot valve 14 according to the invention, and a similar hydraulic valve 1' provided with a solenoid pilot valve 14' according to the prior art.

In FIGS. 9 and 10 in particular two hydraulic valves 1 and 1' are compared where the base body 2, the associated main valve seat 6 and the closing unit 8, 9 have the same dimensions.

The base part of the body 7 which is coupled with the body 2 also has, in the valves compared, the same dimensions; the axial length of the respective tubular portions 7a and 7'a however varies.

In the two compared valves the closing member 24 and the spring 25 also have the same dimensions, while the respective cores 23 and 23' have the same external diameter, but different axial lengths.

In FIGS. 9 and 10, the same parts in the two valves 1 and 1' are indicated by the same numbers for both the valves, while the dimensionally different parts are indicated by the same numbers, but with an apostrophe in the case of the valve 1' according to the prior art.

From FIGS. 9 and 10 it is possible to appreciate visually how, for the same performance, the electromagnetic actuator unit 15-21 of the pilot valve 14 according to the invention has dimensions which are markedly more compact, both in the longitudinal direction and in the transverse direction, and in particular there is a marked reduction in the quantity of copper needed for the solenoid.

From FIG. 10 it also can be seen how, in the case of the valve 1 according to the present invention, the magnetic sleeve 16 has transverse dimensions smaller than the maximum dimensions of the base part 7b of the body 7.

Obviously, without affecting the principle of the invention, the embodiments and the constructional details may be significantly varied with respect to that described and illustrated purely by way of a non-limiting example, without thereby departing from the scope of the invention as defined in the accompanying claims.

The invention claimed is:

1. A solenoid pilot valve (14) with a solenoid (15) for a hydraulic valve (1) of a household appliance, comprising:
   a body (7, 7a) in which there is defined a control chamber (11) which is intended to communicate with the inlet (3) of the hydraulic valve (1) and which, through a restricted outlet passage (12) associated with a valve seat (13), is able to be selectively brought into communication with the outlet (4) of the hydraulic valve (1);

at least one core (23) mounted movably within a portion (7a) of said body (7, 7a) and inside said control chamber (11) and carrying a closing member (24) cooperating with the valve seat (13); and an actuator (16-21) including a solenoid or coil (15) of copper wire, mounted around said portion (7a) of the body (7, 7a), for selectively controlling the position of the core (23) and the closing member (24) with respect to the valve seat (13) and the communication between the control chamber (11) and said restricted outlet passage (12);

wherein the ratio of the diameter (d) of said restricted outlet passage (12) to the weight (m) of the solenoid (16) is between 0.06 and 0.10 mm/g, wherein the pilot valve is for a hydraulic valve (1) which comprises a base body (2) which, around a main opening (2a) for mounting the body (7) of the pilot valve (14), has a plurality of positioning projections (2b) suitable for defining a plurality of angular positions for the actuator (15-21) of the pilot valve (14), said actuator (15-21) having at least one lug (21a; 16e) able to be selectively coupled with one of said positioning projections (2b) so as to define a corresponding angular position of use for the actuator (15-21), and wherein the solenoid (15) is at least partially surrounded by a structure (16) of magnetic material which has at least one transversely protruding lug (16e) able to be selectively coupled with one of said positioning projections (2b).

2. Solenoid pilot valve according to claim 1, wherein the ratio of the axial length (H) of the solenoid (15) to the internal diameter ($D_{in}$) thereof is greater than 1.

3. Solenoid pilot valve according to claim 1, wherein the ratio of the internal diameter ($D_{in}$) of the solenoid (15) to the external diameter ($d_{ex}$) of the core (23) is less than 2.

4. Solenoid pilot valve according to claim 1, wherein said solenoid (15) is intended to be energized with an a.c. voltage of between 200 and 230 V and said solenoid (15) comprises between about 10,500 and 12,500 turns of copper wire having a diameter of between about 0.049 and about 0.056 mm.

5. Solenoid pilot valve according to claim 1, wherein said solenoid (15) is energized with an a.c. voltage of between 100 and 127 V and said solenoid (15) comprises between about 5,000 and about 6,500 turns of copper wire having a diameter of between about 0.063 and about 0.080 mm.

6. Solenoid pilot valve according to claim 1, wherein the solenoid (15) is wound around a reel (17) and the ends thereof are connected to corresponding electric terminals (18) of elongated shape associated with said reel (17), each end of the wire of the solenoid (15) being wound onto the corresponding terminal (18), and a bush (19) made of an electrically conducting material, being fitted around each of said terminals (18) and being compressed and welded around said ends of the wire of the solenoid (15), on the corresponding terminal (18).

7. Solenoid pilot valve according to claim 1, wherein the solenoid (15) is encapsulated in a casing (21) of electrically insulating material, in particular plastic material, which forms a transversely protruding fork (21a) able to be selectively coupled with one of said positioning projections (2b).

8. Solenoid pilot valve according to claim 1, wherein the solenoid (15) is at least partially surrounded by a structure of magnetic material (16) which, transversely with respect to the axis of the core (23), has dimensions which are smaller than the transverse dimensions of aforementioned body (7, 7b).

9. Solenoid pilot valve according to claim 1, wherein the solenoid (15) is at least partially surrounded by a structure of magnetic material (16) including at least one tubular portion (16a, 16b) inside which there is fitted said portion (7a) of the aforementioned body (7) which is provided with anchoring projections (7c, 7d) engaged in corresponding seats (20, 16g) defined in or in the region of said at least one tubular portion (16a, 16b) of the structure of magnetic material (16).

* * * * *